Patented May 7, 1929.

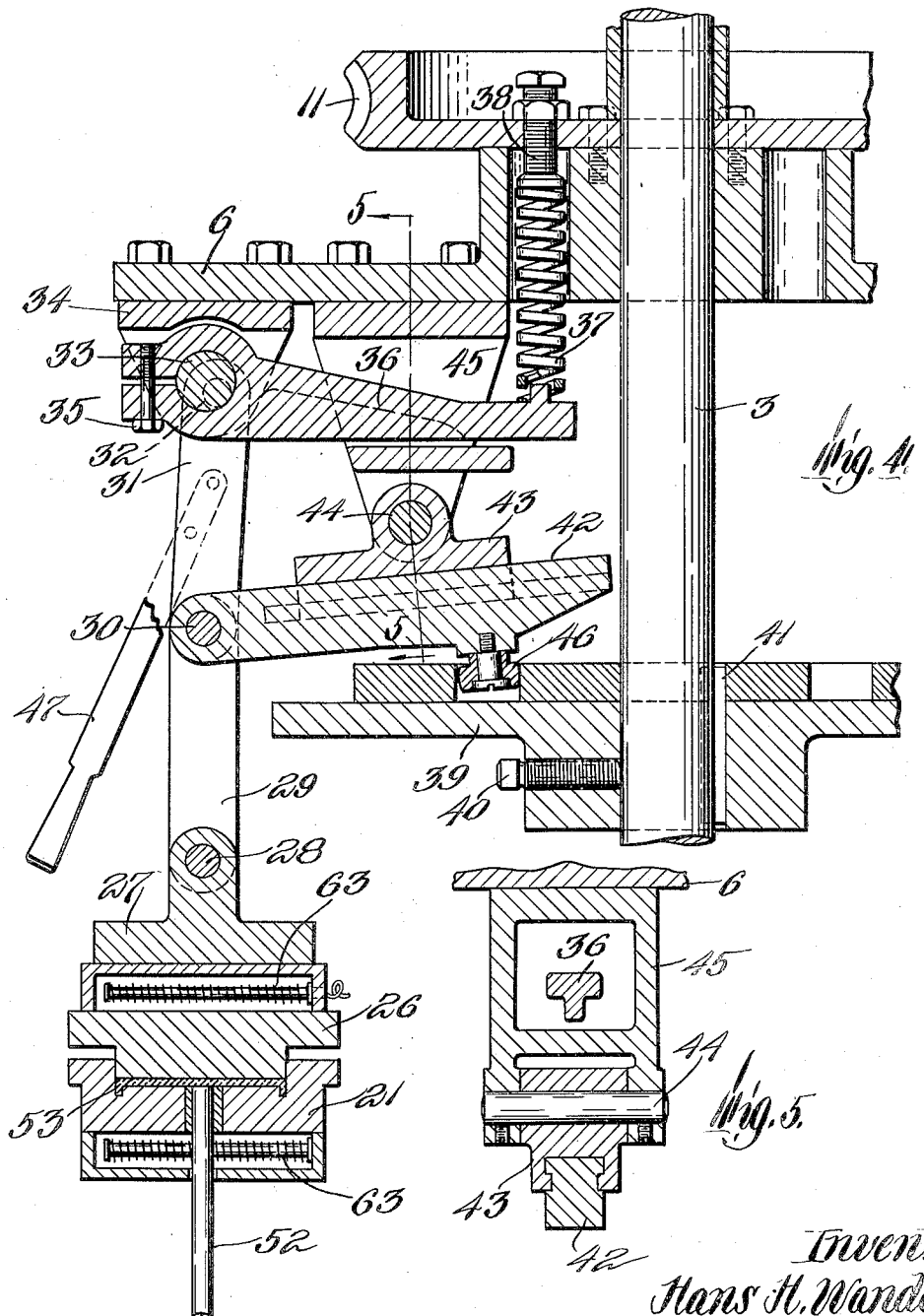

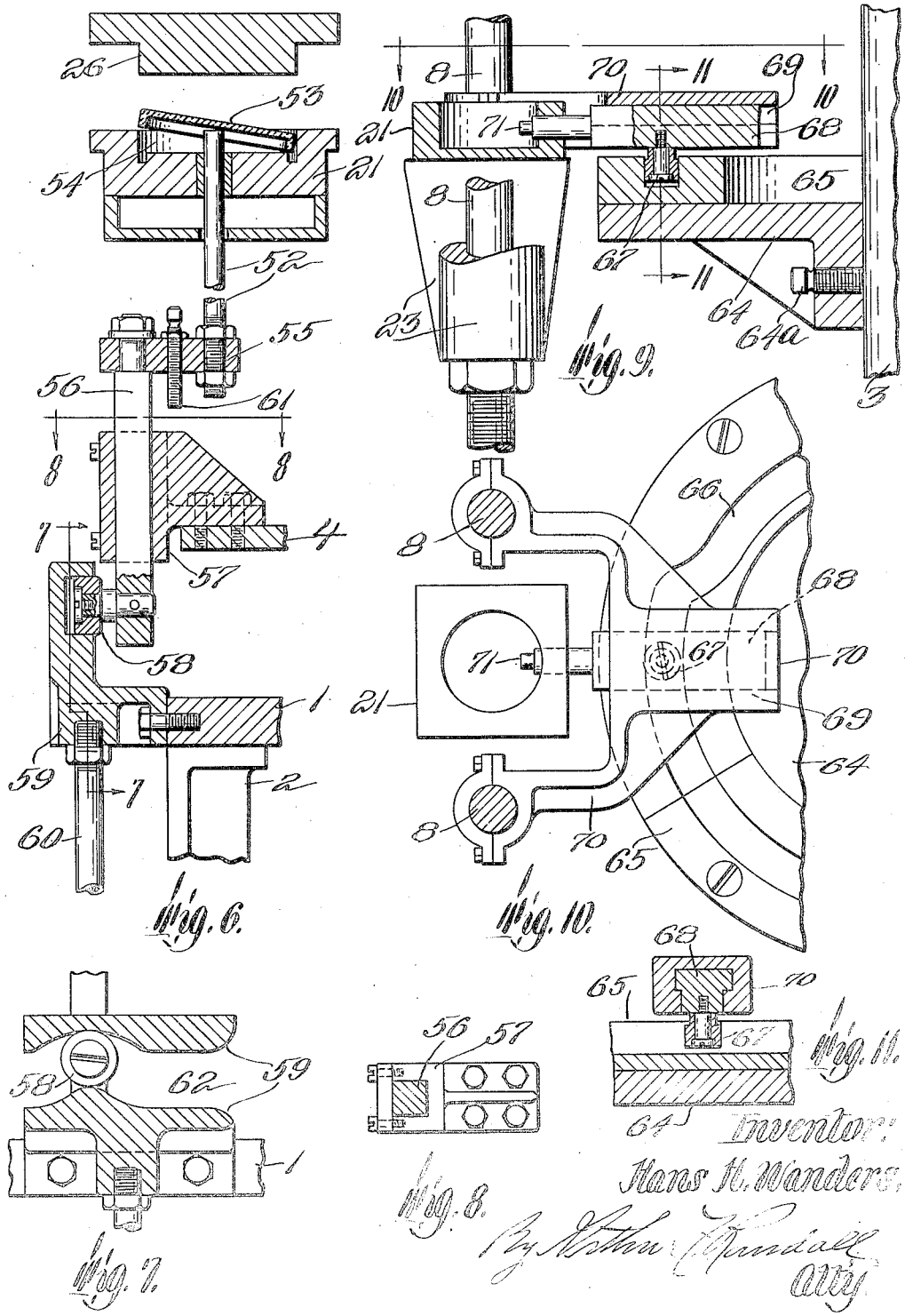

1,711,978

UNITED STATES PATENT OFFICE.

HANS H. WANDERS, OF BOSTON, MASSACHUSETTS.

MOLDING MACHINE.

Application filed February 14, 1927. Serial No. 168,191.

My invention relates to machines for making molded articles and it has for its object, primarily, to provide an improved automatic or semi-automatic machine of that class, and also to provide a machine that is particularly adapted to produce molded articles from phenolic artificial resin and the like wherein the material being molded is held within the mold under pressure for a predetermined length of time to allow the material to become set in its molded shape. It is also an object of this invention to provide a machine of the character indicated which will be of simple and efficient construction and by means of which a single workman or attendant can produce a comparatively great number of molded articles during a given time or period, and at the expenditure of very little manual labor.

To these ends I have provided a molding machine for producing articles in finished shape and condition from moldable material, said machine having the peculiar features of construction and mode of operation set forth in the following description, and the novel features thereof being particularly pointed out and defined in the claims at the close of the description.

In the accompanying drawings:

Figure 4 is a section on line 4—4 of Figs. 2 and 3.

Figure 5 is a section on line 5—5 of Fig. 4.

Figure 6 is a sectional detail illustrating the ejector and its operating means, hereinafter described.

Figure 7 is a section on line 7—7 of Fig. 6.

Figure 8 is a section on line 8—8 of Fig. 6.

Figure 9 is a sectional detail illustrating the removable core and its operating mechanism hereinafter described.

Figure 10 is a section on line 10—10 of Fig. 9.

Figure 11 is a section on line 11—11 of Fig. 9.

Figure 1:
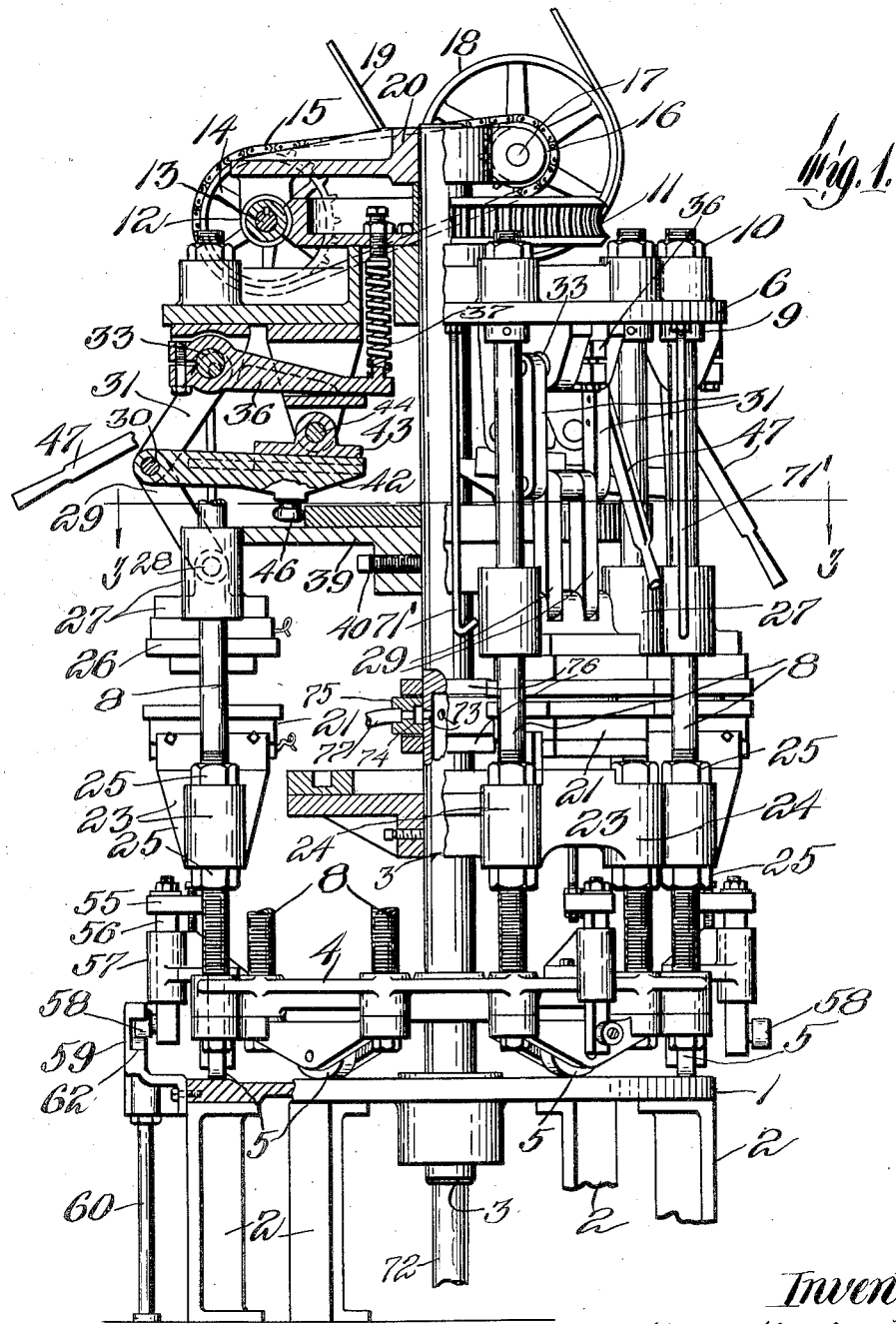
Figure 1 is a side elevation, partly broken away and in section, of a molding machine constructed in accordance with my invention.

The machine herein shown is of the turret type and is semi-automatic in its operation, the turret being continuously rotated in one direction. Upon this turret is mounted a plurality of molding units which are successively brought into loading position where the attendant or operator is located, and automatically opened. While each unit is at this loading position the operator places a quantity of phenolic artificial resin within the lower female mold section after which the operation and control of the molding unit is fully automatic until said unit is brought around again into loading position, provided however, that the operator, through an act on his part, establishes co-operative relationship between each molding unit, as it leaves loading position, and the means for automatically operating and controlling said unit while it is making the circuit of its travel with the turret.

Having reference to the drawings, 1 is a circular bed plate supported from the floor or other suitable fixture by legs 2 and at the middle of this plate 1 is fixed the lower end of an upstanding post 3 which serves as the pivot or axle on which the turret rotates. The turret comprises a lower head 4 carrying, upon its under side, trucks or rollers 5 resting upon the top of the bed plate 1 which serves as a runway therefor and on which the turret is rotatably supported by the trucks or rollers. Near the upper end of the fixed post 3 is an upper turret head 6 connected with, and supported by, the lower head 4 by means of a number of pairs of rods 8, one pair for each molding unit of the turret. The lower end portions of the rods 8 are threaded and screwed into threaded holes provided in the lower head 4, while the upper ends of these rods are provided with collars 9 against which the upper head 6 is rigidly clamped by means of nuts 10 mounted upon the upper threaded end portions of the rods. Fixed to the top side of the upper head 6 is a worm gear 11 driven by a worm 12 fast on a shaft 13 carrying a sprocket 14 connected by a chain 15 with a sprocket 16. This sprocket 16 is fast on a shaft 17 carrying a pulley 18 to which power is applied by means of a belt 19. The two shafts 13 and 17 are journaled in bearings on a bracket 20 rigidly fastened to the upper end of the post 3.

Each molding unit comprises a lower female mold section 21 secured to a bracket 23 having apertured wings 24 through which the rods 8 of the unit loosely extend. Nuts 25 fix each bracket 23 rigidly in position on its rods 8 but with provision for vertical adjustment.

Each molding unit also comprises an upper male mold section 26 fastened in position against the under side of a cross head 27 that is slidably mounted, at opposite ends thereof, upon the two rods 8 of the unit. To the top side of each cross head 27 is pivotally connected, at 28, the lower ends of two toggle links 29 whose upper ends are pivotally connected by a pintle 30 with the lower ends of another pair of toggle links 31. The upper ends of the two toggle links 31 are pivotally mounted upon eccentric trunnions 32 provided at the opposite ends of an arbor or rock shaft 33 journaled in brackets 34 forming part of the upper head 6. That is, the rock shaft 33 is of relatively large diameter while the trunnions 32 at the ends thereof, which are integral therewith, are of relatively small diameter and eccentrically disposed with relation to the axis of the rock shaft 33. To the middle portion of each rock shaft 33 is rigidly clamped, by means of a screw 35, the split hub of a lever arm 36 projecting therefrom radially inwardly towards the post 3. At the inner end of each lever arm 36 is a coil spring 37 whose upper end is seated against an adjustable abutment 38 and whose lower end bears against the top side of the lever arm 36.

The toggle 29—31 of each molding unit is operated to raise and lower the mold section 26 by a cam 39 rigidly fastened by a set screw 40 and key 41 to the stationary post 3, said cam acting upon the toggle through a radially disposed toggle actuating member 42 pivotally connected at its outer end to the toggle by means of the middle pintle 30 and slidably mounted in a bracket 43 pivotally connected at 44 with the upper head 6 of the turret. As herein shown, the bracket 43 is formed with a hub to receive the pin 44, said hub portion being disposed between the arms of a yoke 45 carrying the pin 44 and secured to and forming part of the upper head 6 of the turret. Upon its under side the toggle operating member 42 is provided with a truck or roll 46 that is engaged by the cam 39 to move the member 42 radially and thereby operate the toggle. It will thus be clear that the bracket 43 provides a rocking support for the member 42 on which the latter is free to slide radially as it is moved in and out by the cam 39.

A handle 47 is provided for each molding unit, said handle being fastened to and projecting outward from one of the upper links 31 of the unit so as to be accessible to the operator for use in establishing co-operative relationship between the molding unit and the cam 39 as will presently be described.

Figure 2:
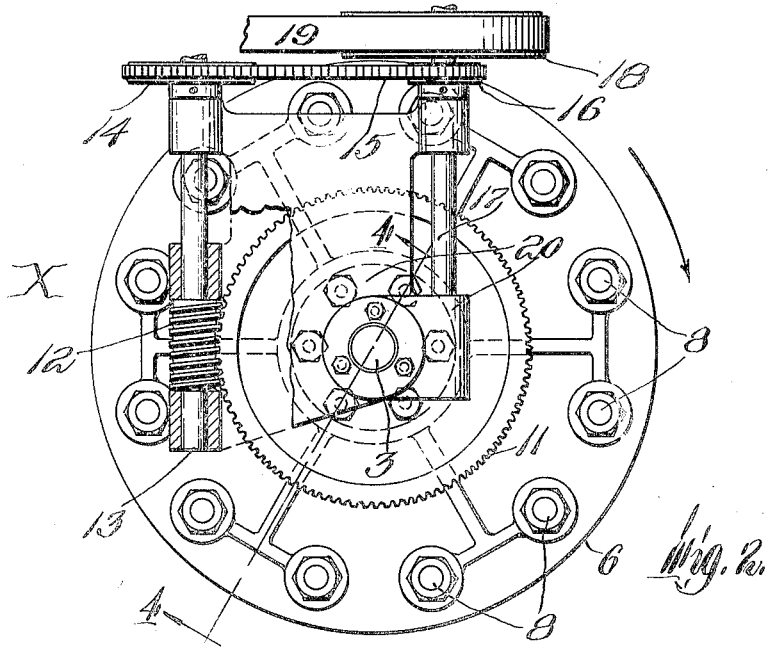
Figure 2 is a top plan view, partly broken away, of the machine shown in Fig. 1.
Figure 3:
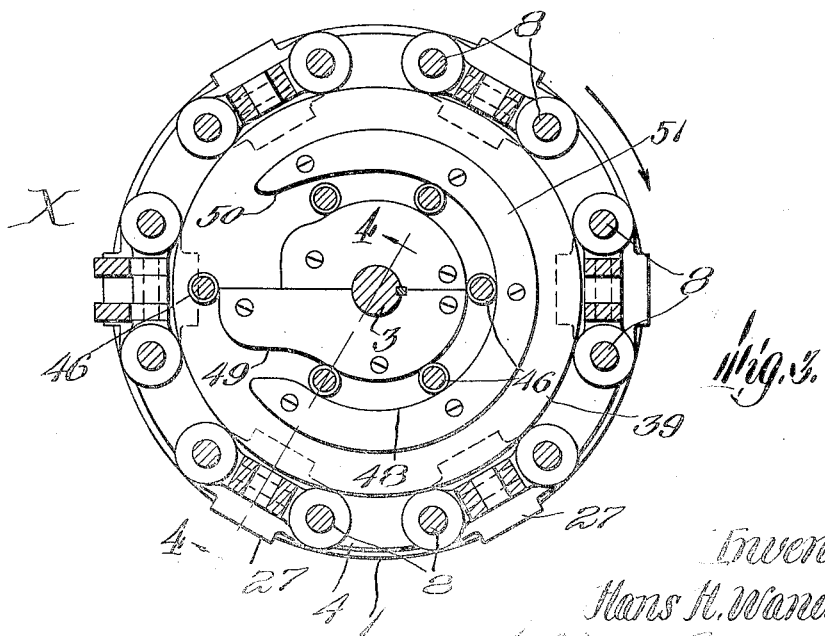
Figure 3 is a section on line 3—3 of Fig. 1.

When the machine is in operation the turret is continuously rotated in a clockwise direction, as viewed in plan and as indicated by the arrows in Figs. 2 and 3, and the molds are successively brought into a position at which they are opened, unloaded and loaded. The attendant or operator looking after the machine is stationed at this position, indicated at X in Figs. 2 and 3. As each molding unit arrives at this position X its roll 46 passes out of engagement with a circular segmental locking shoulder 48 that is concentric with the axis on which the turret rotates and into engagement with a cam shoulder 49 which moves the cam roll 46 and its slide 42 radially outward buckling the toggle 29—31 and raising the upper mold section 26 into its elevated position where it is held and locked by a spring latch 71'. When the toggle operating slide 42 is thus moved outwardly by the cam shoulder 49 it is positioned outside of or beyond a closing and pressure applying cam shoulder 50 that is provided at one end of the circular segmental shoulder 48 and it will therefore be clear that unless the operator unlocks the upper mold section and pushes downwardly and inwardly upon the handle 47 as the cam roll 46 approaches the cam shoulder 50, then said cam roll will pass idly around the machine outside of the ring segment 51 on which the shoulders 48 and 50 are provided. Therefore, when the cam roll thus travels idly around the outside of the cam ring segment 51 the molding unit will idle. If, however, the operator unlocks the upper mold section and pushes inwardly and downwardly upon the handle 47 as the cam roll of the unit approaches the cam shoulder 50, he will partially close the mold and also move the cam roll inwardly so as to be engaged by the cam shoulder 50. Continued movement of the cam roll with the unit, causes the cam shoulder 50 to forcibly move the rocking slide 42 inwardly thereby straightening the toggle 29—31, fully closing the mold and applying great downward pressure upon the upper mold section 26. This great pressure upon the material within the mold is maintained by the concentric portion or shoulder 48 of the ring segment 51 while the cam roll 46 is travelling from the cam shoulder 50 around to the cam shoulder 49.

As each molding unit leaves the cam shoulder 49, and while it is travelling toward the cam shoulder 50, the upper mold section 26 occupies its elevated position, and during this time an ejector rod 52, Figs. 4 and 6, is raised and lowered thereby dislodging and elevating the article 53 that has been molded so that it can be removed by the operator, and a quantity of phenolic artificial resin or the like is substituted within the mold. The upper end of this ejector rod 52 occupies an aperture provided at the middle of the cavity 54 of the lever mold section 21 and, as shown in Fig. 4, the upper end of this rod 52 constitutes a portion of the bottom wall of the cavity when the rod occupies its lowermost position. At its lower end the ejector rod 52 is fixed to an arm 55 projecting from a slide 56 mounted to move vertically in ways provided on a bracket 57 secured to the lower head 4 of the turret. At its lower end slide 56 carries a cam roll 58 adapted to co-operate with a stationary cam 59, herein shown in the form of a bracket fastened by screws to the outside of bed plate 1 and supported from the floor by a post 60. Normally the slide 56 occupies its lowermost position with an adjustable stop screw 61 resting against the top side of the bracket 57 and with the cam roll 58 in the same horizontal plane with the entrance end of the cam groove 62 of the cam bracket 59. The cam bracket 59 is positioned so that the cam roll 58 of each unit passes through the groove 62 thereof while the cam roll 46 of the rocking slide 42 is passing from the toggle operating cam shoulder 49 to the toggle operating cam shoulder 50, Fig. 3, and, of course, the cam roll 58 has passed beyond the cam 59 when the cam roll 46 comes into engagement with the toggle operating cam 50.

As is required in molding phenolic artificial resin or the like, the two mold sections 21 and 26 of each unit are heated, preferably by means of electrically operated heating units 63 which may be of ordinary construction and which serve to maintain the mold sections at the desired and necessary temperature particularly during the interval of time each molding unit is passing from the cam shoulder 50 around to the cam shoulder 49 during which time the material being molded is subjected to both pressure and heat.

From the above description of the mold operating toggle mechanism, illustrated particularly in Fig. 4, it will be observed that the trunnions 32 of each molding unit constitute wrist pins, or crank pins, at the opposite sides of a rotatable abutment member consisting of the arm 36 and arbor 33 and it will be clear that when the rocking slide 42 is operated to straighten the toggle 29—31 the reaction occasioned by the resistance of the material within the mold is applied to the wrist pin trunnions 32 in a direction tending to swing the arm 36 upwardly. The distance of the axes of the wrist pin trunnions 32 from the axis of the arbor 33 is very small as compared with the distance from the axis of the arbor 33 to the point of the application of the pressure of spring 37, and the pressure of the latter may be so adjusted by means of abutment 38 that under normal conditions the position of the arm 36 will not be disturbed during the molding operation, but in the event, however, that a surplus of material is placed within the mold at position X, or in the event that the hardness of the material varies materially, then the first application of pressure to force the mold sections together will result in slight upward displacement of the arm 36 which, however, will ordinarily be restored to its normal position by spring 37 as the material within the mold flows into its proper position. It is a feature of importance that the effective pressure of the spring 37 remains constant for all positions of the arm 36, or approximately so, for the reason that when said arm occupies its lowermost position and spring 37 is exerting the least force thereon the leverage through which the link 31 is acting to swing the arm 36 upward is also the least, or at its minimum, and it will be clear that as this leverage increases through upward movement of the arm 36 there is a compensating increase in the pressure of the spring 37 upon the free end of the lever.

In the best form of my invention the cam 39 comprises a disk-like body fastened rigidly to the stationary post 3 to the top side of which are secured by means of screws cam plate sections that provide the cam shoulders 49 and 50 and the concentric holding shoulder 48.

The mold sections 21 and 26 are removable so that other kinds of molds can be substituted therefor, and as will be clear the method of mounting the lower mold section bracket 23 upon the rods 8 provides for accurate adjustment of the lower mold section with respect to the lowermost position of the upper mold section. It is also a feature of this invention that the cam plates providing the cams 49 and 50 and the holding shoulder 48, are removable so that other plates appropriate to the mold being used or appropriate to the desired mode of operation of the units, can be substituted.

When the cam shoulder 49 moves the toggle operating slide outwardly thereby raising the upper mold section, the latter is caught and held in its elevated position by a spring latch 71' said latch being fastened at its upper end to the upper head 6 of the turret and provided at its lower end with an offset which comes into position beneath the cross-head 27 when the latter arrives at its uppermost position. It will, therefore, be clear that when the operator uses the handle 47 to place the molding unit back into co-operative relationship with the cam 39 he first manually retracts the latch 71' and then operates said handle to straighten the toggle 29—31. This latch 71' is provided, when desired, as an automatic means for locking the mold section 26 in its elevated position while it is travelling idly around the machine.

In Figs. 9, 10 and 11 is illustrated a core mechanism which may be employed in connection with the mechanism above described. This core mechanism comprises a cam including a base plate 64 fastened by a set screw 64ª to the post 3 between cam 39 and the lower turret head 4 as shown in Fig. 1. Upon the top side of this base plate 64 is fastened a sectional cam ring 65 having a cam groove 66 occupied by a cam roll 67 mounted upon the under side of a core carrying slide 68. Slide 68 is mounted in ways 69 provided upon a bracket 70 having arms, Fig. 10, rigidly fastened to the two rods 8 of each unit. As the turret revolves, the cam roll 67 traverses the slot 66 and this slot is shaped so as to hold the slide 68 at the limit of its outward movement during the time that the cam roll 46 of the unit is travelling from the cam 50 to the cam 49 and, as will be clear, the core 71 at the inner end of the core carrying slide 68 will form a recess or hole in the side of the article being molded. During the time that the cam roll 46 of the unit is travelling from cam 49 to cam 50 the cam 66 withdraws the core 71 from the mold thereby permitting removal of the article that has been molded.

From the above description it will be seen that I have provided an improved machine that is especially adapted to mold articles or objects from phenolic artificial resin and the like and that this machine is of simple and efficient construction, its use enabling a single workman to produce, in a given length of time, a greater number of molded articles of the character described than has heretofore been possible. It is also to be observed that while I have herein illustrated all of the features of my invention as embodied in a semi-automatic machine of the turret type it is to be understood that some of those features are not limited to use or embodiment in a machine of this particular type.

It will also be clear that by removing the spring latch 71' each molding until will remain continuously in co-operative relation with the mold operating cam 39.

When it is desired to utilize steam for heating the mold sections I may make the upright axle 3 tubular and provide a pipe 72 connecting the lower end thereof with a steam supply. Near its middle the tubular axle 3 may be provided with ports 73 connecting its interior with an annular chamber 74 provided upon the interior of a sleeve or manifold 75 rotatably mounted upon the axle 3 between two collars 76. The manifold 75 is formed with radial ports adapted to be connected by flexible pipes 77 with the steam jackets (not shown) of the mold sections.

What I claim is:

1. A machine for molding objects from moldable material comprising a relatively fixed mold section; a relatively movable mold section; a toggle whereof one end is pivotally connected with the movable mold section; a rotatably supported abutment member to which the opposite end of said toggle is pivotally connected eccentrically with respect to the axis of said rotatable abutment; means for operating said toggle, and a spring acting on said rotatably supported abutment member to yieldingly oppose rotation thereof under the influence of the thrust of the toggle when the latter is operated to close the movable mold section.

2. A machine for molding objects from moldable material comprising a relatively fixed mold section; a relatively movable mold section; a toggle whereof one end is pivotally connected with the movable mold section; a rotatably supported abutment member provided with an eccentrically disposed wrist pin on which the opposite end of the toggle is pivotally mounted; means for operating said toggle, and means connected with said rotatably supported abutment member to yieldingly oppose rotation of said abutment member under the influence of the thrust of the toggle when the latter is operated to close the movable mold section.

3. A machine for molding objects from moldable material comprising a relatively movable mold section; a relatively fixed mold section; a toggle whereof one end is pivotally connected with the movable mold section; a rotatably supported abutment member to which the opposite end of said toggle is pivotally connected eccentrically with respect to the axis of said rotatable abutment member; means for operating said toggle, and means acting on said rotatably supported abutment member with a predetermined approximately constant effective pressure that yieldingly opposes but permits rotation thereof under the influence of the thrust of the toggle when the latter is operated to close the movable mold section and the closing movement of said section is arrested before the closing movement of the toggle is completed.

4. In a molding machine of the character described the combination with a turret; means for rotating said turret, and a plurality of molding units carried by said turret each including a fixed mold section, a movable mold section; a toggle for operating said movable mold section and an actuating member for and connected with said toggle, of stationarily supported means successively engaging the said actuating members of the units to automatically lock each movable mold section in closed position as it leaves loading position, to maintain said section locked closed and under pressure until the unit nears loading position again, and for automatically opening said movable section as it arrives at loading position.

5. A molding machine of the character described constructed in accordance with claim 4 and also including automatic means for locking the movable mold section in the open position to which it is shifted as it arrives at loading position.

6. A molding machine of the character described constructed in accordance with claim 4 and also including automatic means for locking the movable mold section in the open position to which it is shifted as it arrives at loading position and whereby the unit of which it forms part is maintained idle until said movable mold section is manually unlocked and said unit is manually restored to co-operative relationship with said stationarily supported toggle controlling and operating means.

7. A molding machine of the character described constructed in accordance with claim 4 and also including automatically operated means for engaging and dislodging the molded object while the movable mold section occupies its open position.

8. A molding machine of the character described constructed in accordance with claim 4 and wherein the stationarily supported toggle operating means consists of a fixed cam shoulder acting through the toggle actuating member and the toggle to force the movable mold section into its closed position; a fixed arcuate shoulder concentric with the axis of the turret and engaging the toggle actuating member throughout the greater portion of its travel to lock and hold the movable mold section in its closed position, and a fixed cam shoulder engaging said toggle actuating member to shift said movable mold section into it open position.

9. A molding machine of the character described comprising a turret; means for rotating said turret; a plurality of molding units each constructed in accordance with claim 1 and also including a toggle actuating member, a bracket with which said member is slidably connected, and means pivotally supporting said bracket, and stationarily supported cams co-operating with the toggle actuating members of said units to operate and control the movable mold sections.

10. In a machine of the character described, the combination with an immovably supported upright axle, of a turret comprising a lower head rotatably mounted on said axle; an upper head rotatably mounted on said axle; a number of pairs of rods rigidly fastened at their ends to said heads; a mold section rigidly fastened to each pair of rods with provision for adjustment longitudinally thereof; a movable mold section slidably connected with each pair of rods; a toggle pivotally connected at one end with said movable mold section and pivotally connected at its opposite end to one of said heads; a toggle actuating member pivotally connected to the intermediate joint of each toggle; cam mechanism stationarily supported by said axle and engaging said toggle actuating member, and means for rotating said turret.

11. In a machine of the character described, the combination of a fixed bed frame; an axle immovably supported in an upstanding position by said bed frame; a turret rotatably mounted on said axle and supported by said bed frame; molding units carried by said turret each including a toggle for operating the movable section thereof; said toggle having one end thereof pivotally connected with the movable section of the molding unit and the other end thereof pivotally connected with the turret; an inwardly extending and laterally disposed slide connected with the intermediate joint of each toggle; a bracket pivotally mounted on said turret and slidably supporting the inner end of said slide; cam mechanism stationarily supported by said axle and acting through said slide to operate the toggle to which the latter is connected, and means for rotating said turret.

12. A molding machine comprising a fixed mold section; a movable mold section; a toggle whereof one end is pivotally connected with said movable mold section; an abutment with which the opposite end of said toggle is pivotally connected a toggle actuating member having one end thereof pivotally connected with the intermediate joint of the toggle; means for supporting and guiding the opposite end of said toggle actuating member, and cam mechanism acting through said toggle actuating member to control and operate the toggle, said cam mechanism and said actuating member being rotatably movable relatively and said cam mechanism including a cam acting through said member and toggle to close the mold, means acting through said member to lock the mold closed for a predetermined length of time, and means acting through said member and toggle to open the mold after it has been locked closed.

13. In a machine of the character described, the combination of a turret supported to rotate on a vertical axis, comprising a lower head; an upper head; a plurality of molding units between and carried by said heads, each of said units including a movable mold section; a toggle whereof one end is pivotally connected with said movable mold section; an abutment rotatably mounted on the upper head and to which the opposite end of said toggle is pivoted eccentrically with respect to the axis of said rotatable abutment; a spring carried by said upper head and acting on said rotatable abutment to yieldingly oppose rotation thereof under the influence of the thrust of said toggle; a bracket pivotally mounted on said upper head; a toggle operating slide carried by said bracket; stationarily supported cam mechanism acting through said slide to operate and control the toggle, and means for rotating the turret and parts carried thereby.

14. A machine of the character described comprising a fixed vertically disposed axle; a turret rotatable on said axle; a plurality of molding units mounted on said turret and movable with the latter past a loading station successively, each unit comprising a fixed mold section and a movable mold section; a toggle carried by the turret for shifting the movable mold section toward and from the fixed mold section and means stationarily supported by said axle for operating and controlling said shifting means to close the movable mold section as its unit leaves the loading station and to hold said section closed while its unit is traveling away from the loading station and until it again reaches said loading station.

15. A machine of the character described comprising a fixed vertically disposed axle; a turret rotatable on said axle; a plurality of molding units mounted on said turret and movable with the latter past a loading station successively, each unit comprising a fixed mold section and a movable mold section; a toggle carried by the turret for shifting the movable mold section toward and from the fixed mold section; a resilient abutment for each toggle mounted on the turret; and means stationarily supported by said axle for operating and controlling said shifting means to close the movable mold section as its unit leaves the loading station and to hold said section closed while its unit is traveling away from the loading station and until it again reaches said loading station.

16. In a machine of the character described the combination of a fixed vertical axle; a turret rotatable on said axle; means for rotating said turret; molding units mounted on said turret and carried successively past a loading station by said turret, each unit including a fixed mold section having a cavity and a movable mold section adapted to completely inclose the material that is being molded when in closed relationship; means on said axle for operating and controlling said molding units; a core mounted on said turret and movable into and out of the cavity of said fixed mold section at one side of the latter, and means on the axle for operating and controlling said core in timed relation with the movement of its unit relatively to said loading station.

Signed by me at Boston, county of Suffolk and State of Massachusetts, this 4th day of January, 1927.

HANS H. WANDERS.